No. 711,807. Patented Oct. 21, 1902.
F. J. WICH.
TRIMMING MECHANISM FOR LINOTYPE MACHINES.
(Application filed Jan. 23, 1902.)
(No Model.) 7 Sheets—Sheet I.

Fig.1.

Witnesses.

Inventor
Ferdinand John Wich
per
Attorney.

No. 711,807. Patented Oct. 21, 1902.
F. J. WICH.
TRIMMING MECHANISM FOR LINOTYPE MACHINES.
(Application filed Jan. 23, 1902.)
(No Model.) 7 Sheets—Sheet 2.

Fig. 2.

Witnesses.

Inventor
Ferdinand John Wich
per Attorney.

No. 711,807. Patented Oct. 21, 1902.
F. J. WICH.
TRIMMING MECHANISM FOR LINOTYPE MACHINES.
(Application filed Jan. 23, 1902.)
(No Model.)
7 Sheets—Sheet 3.

Witnesses.

Inventor
Ferdinand John Wich
per
Attorney.

No. 711,807. Patented Oct. 21, 1902.
F. J. WICH.
TRIMMING MECHANISM FOR LINOTYPE MACHINES.
(Application filed Jan. 23, 1902.)

(No Model.) 7 Sheets—Sheet 4.

Witnesses. Inventor
Ferdinand John Wich.
per
Attorney.

No. 711,807. Patented Oct. 21, 1902.
F. J. WICH.
TRIMMING MECHANISM FOR LINOTYPE MACHINES.
(Application filed Jan. 23, 1902.)
(No Model.) 7 Sheets—Sheet 5.

Witnesses.
W. R. Kenney
F. S. Elmore

Inventor
Ferdinand John Wich
per [signature]
Attorney.

No. 711,807. Patented Oct. 21, 1902.
F. J. WICH.
TRIMMING MECHANISM FOR LINOTYPE MACHINES.
(Application filed Jan. 23, 1902.)
(No Model.) 7 Sheets—Sheet 7.

Witnesses.

Inventor
Ferdinand John Wich
per O. T. Dodge
Attorney.

THE NORRIS PETERS CO., PHOTO-LITHO., WASHINGTON, D. C.

UNITED STATES PATENT OFFICE.

FERDINAND JOHN WICH, OF BROADHEATH, ENGLAND.

TRIMMING MECHANISM FOR LINOTYPE-MACHINES.

SPECIFICATION forming part of Letters Patent No. 711,807, dated October 21, 1902.

Application filed January 23, 1902. Serial No. 90,881. (No model.)

*To all whom it may concern:*

Be it known that I, FERDINAND JOHN WICH, of the Linotype Works, Broadheath, in the county of Chester, England, have invented certain new and useful Improvements in the Trimming Mechanism of Linotype-Machines; and I do hereby declare the following to be a full, clear, and exact description of the invention, such as will enable others skilled in the art to which it appertains to make and use the same.

This invention relates to improvements in the trimming mechanism of linotype-machines, and is more particularly applicable to the trimming mechanism of the Mergenthaler linotype-machine described in the specification of United States Letters Patent No. 436,532. The object is to effect an automatic adjustment of the trimming-knives, so that the distance between them will correspond with the width of the variable slot in the mold and the thickness of the linotype produced therein, so that a change in the thickness or body of the slugs produced will be accompanied by a corresponding adjustment of the knives. In this machine a composed line of matrices and space-bars providing the mold for the printing edge of the linotype is held by a vise in a horizontal position, with the casting-face of it vertical and in front of one side of a so-called "mold-wheel" adapted to rotate about a horizontal axis parallelly with the plane of the said casting-face. The mold for the body of the linotype is a slot extending through the wheel or through a detachable mold-block fast on said wheel. The mold-wheel stands behind the composed line and normally at some little distance from it, the slot being then vertical and to the right and below the level of the composed line. At the proper moment the mold-wheel is turned through a quarter of a circle, thereby putting the mold-slot into horizontal position immediately at the rear of the mold for the printing edge and is next pushed forward until the mold-slot makes metal-tight contact with the composed line. The nozzle of the metal-pot is next moved forward until it makes metal-tight contact with the rear of the mold-slot and then molten type-metal is injected into the compound mold by suitable mechanism, thereby casting a linotype. The metal-pot and the mold-wheel are then moved to the rear, the printing edge of the linotype being withdrawn from its mold and the said linotype remaining in the mold-slot. The mold-wheel is next turned through three-quarters of a circle in the same direction as before and stopped, when it is holding the linotype immediately in line with the space between a pair of knives in front of it and with an ejector at the back of it, the said knives standing at a distance apart equal to the thickness of the finished linotype. The mold-wheel is next moved forward to bring the linotype up to the knives, whereupon the ejector pushes the linotype out of the mold-slot and between the knives into a galley, the knives trimming off the sides of the linotype as it is pushed between them. The mold-wheel is next moved backward into its normal position. One of the trimming-knives is always fixed in a definite position and the other one generally so. Under any circumstances they must both be rigidly stationary during the passage of the linotype between them. When the machine is used for producing display-linotypes, the knife just referred to as the "other one" has been movable in a guide to enable it to be withdrawn from the path of the overhang of the large capitals of such linotypes. It has also been adjustable to and from the fixed knife to vary the distance between them according to the particular font the machine is working with. Every such adjustment, however, has hitherto been made manually by the operator.

The present invention consists in means whereby the distance between the two trimming-knives is automatically adjusted to correspond with the varying thicknesses of the slugs produced in the mold. The result is preferably accomplished, as herein described and shown, by mechanically separating the knives after each casting operation and thereafter controlling their approximation by gages and stops which are controlled in their position and action by the mold.

Referring to the accompanying drawings, which are to be taken as part of this specification and read therewith.

Throughout the several figures of the drawings like letters and numerals of reference are used to indicate like or corresponding parts.

A represents portions of the machine-frame; $a^6$, the cam-shaft; O, the mold-wheel; $o^5$, its gear-teeth; $o^{17}$, the cap-plate, and $o^{18}$ the bottom plate, of the mold-block; o, the mold-slot between the cap-plate $o^{17}$ and bottom plate $o^{18}$; P', the vise-frame.

All the parts just enumerated are substantially as described in the before-mentioned specification of Letters Patent No. 436,532, the same letters of reference being used to identify them in both specifications.

In carrying the invention into effect means are provided by which at each casting operation the adjustable knife 1 is automatically moved away from the fixed knife 2 for an extreme distance and a stepped or tapered gage-bar 3 is adjusted in the return path of the adjustable knife to arrest the said knife during its return movement when it is at a distance from the fixed knife corresponding to the thickness of the finished linotypes which the mold is for the time being adapted to produce.

Figure 21:
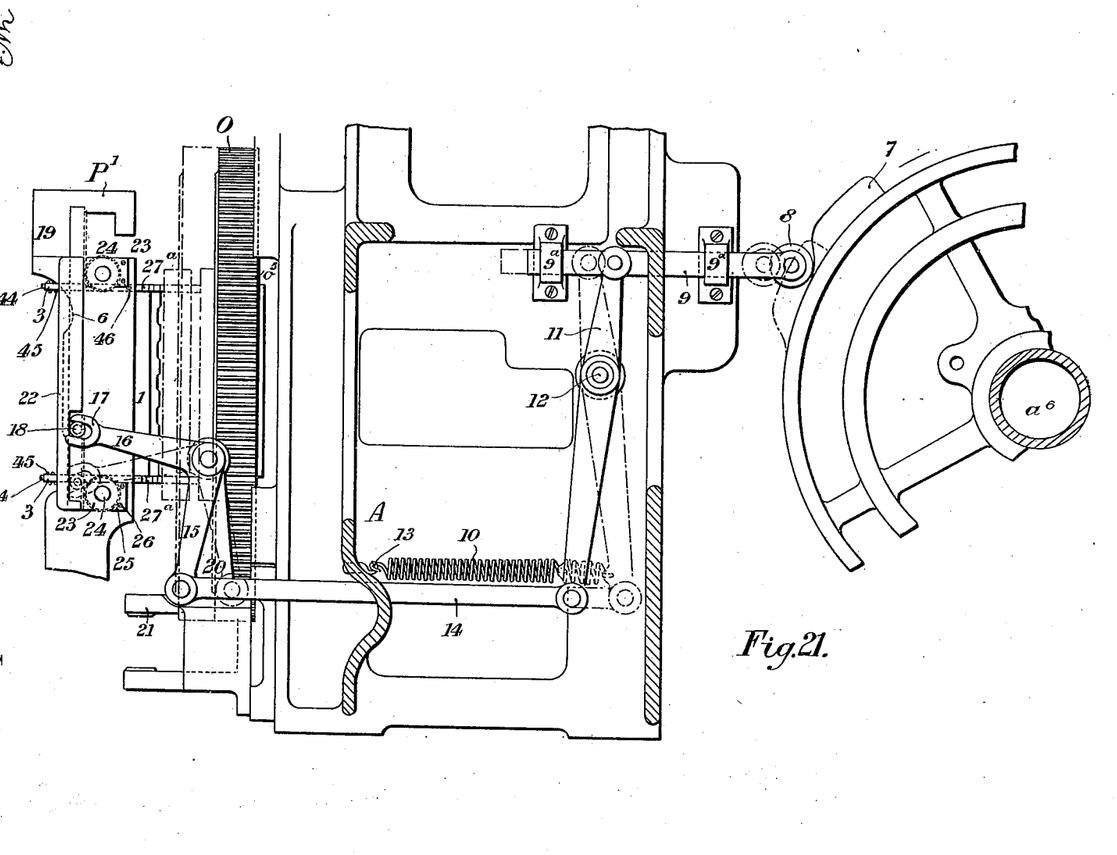
Fig. 21, a sectional view looking from the right of the machine, showing the present improvements applied to a linotype-machine fitted with an adjustable mold-block such as that described in United States Letters Patent No. 648,449.
Figures 22, 31:
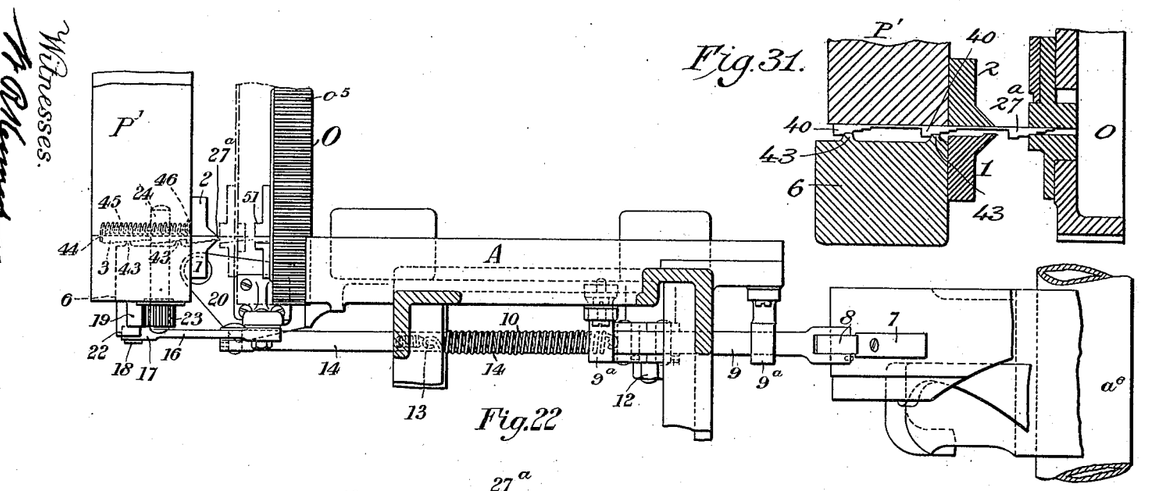
Fig. 22, a plan of Fig. 21.
Fig. 31 is a horizontal cross-section through the lower ends of the knives, illustrating the action of the mechanism shown in Figs. 18, 19, &c.
Figures 23, 24, 25, 26:
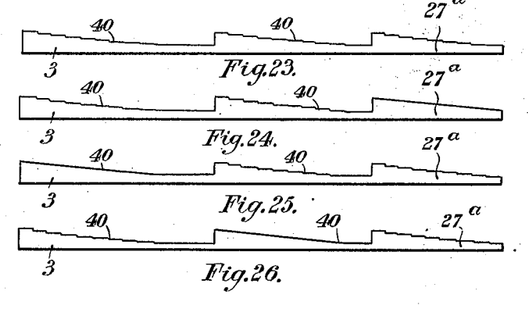
Figs. 23, 24, 25, 26, 27, 28, 29, and 30, plans of alternative forms of combined gage and feeler bars of the apparatus shown in Figs. 21 and 22.
Figures 27, 28, 29, 30:
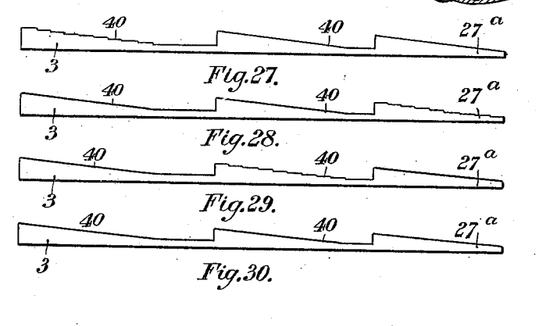

The stationary knife 2 is rigidly secured by two bolts 4 4 to the vise-frame P', forming part of the main frame, in the usual manner, and the adjustable knife 1 is similarly secured by two bolts 5 5 to the horizontally-movable knife-block 6. This block 6, as hereinafter described, receives a retreating motion to increase the separation of the knives from a cam 7 on the cam-shaft $a^6$ of the machine, as shown in Figs. 21 and 22, said cam once during each revolution of the cam-shaft $a^6$ and through an antifriction-roller 8 moving forward a horizontal push-rod 9 in opposition to a spring 10, which effects the rearward or return movement of the push-rod 9. The push-rod 9 is free to slide in two guides $9^a$ $9^a$, secured to the frame A, and is pivotally connected to the upper end of a lever 11, pivoted on a horizontal fulcrum 12, also secured in the frame A. The rear end of the before-mentioned spring 10 is connected to the lower end of the lever 11, its forward end being attached to a hook or equivalent 13, secured in the frame A. The lower end of the lever 11 is pivotally connected to the rear end of a link 14, whose forward end is similarly connected to the downwardly-depending arm 15 of a bell-crank lever 15 16, the other arm 16 of which by a fork 17 engages an antifriction-roller 18, pivotally mounted on a rack 19. The bell-crank lever 15 16 is pivoted on a bracket 20, rigidly secured to the usual starting-handle bracket 21. The rack 19 is adapted to reciprocate in a vertical guide 22 in the block 6 of the adjustable knife 1, and it is in engagement with two internally-screw-threaded spur-pinions 23 23, each of which is free to rotate on a stud 24, rigidly secured to the vise-frame P' near one end of the fixed knife 2. The spur-pinions 23 23, or, as they are hereinafter called, "the threaded pinions," are each held to the movable knife-block 6, so as to be capable of being moved only about the axis of the respective stud 24 by a pair of plates 25 25, fastened to the said block by four screws 26 26 and engaging with an annular groove or throat formed around the threaded pinion 23. By the arrangement just described each oscillation of the bell-crank lever 15 16 causes the movable knife-block 6, together with the adjustable knife 1, the rack 19, and threaded pinions 23 23, to move first toward the right and then toward the left of the machine, the antifriction-roller 18 being sufficiently long and the forked end 17 of the bell-crank lever 15 16 being so positioned relatively to the rack 19 as to admit without obstruction of the rack 19 moving laterally and the antifriction-roller 18 moving axially to the required extent relatively to the bell-crank lever 15 16. In other words, the cam 7 through the intermediate parts moves the knife 1 away from its companion to the extreme distance demanded in practice.

Figures 7, 8, 9, 10, 11, 12, 13, 14, 15, 16, 17, 18, 19, 20:
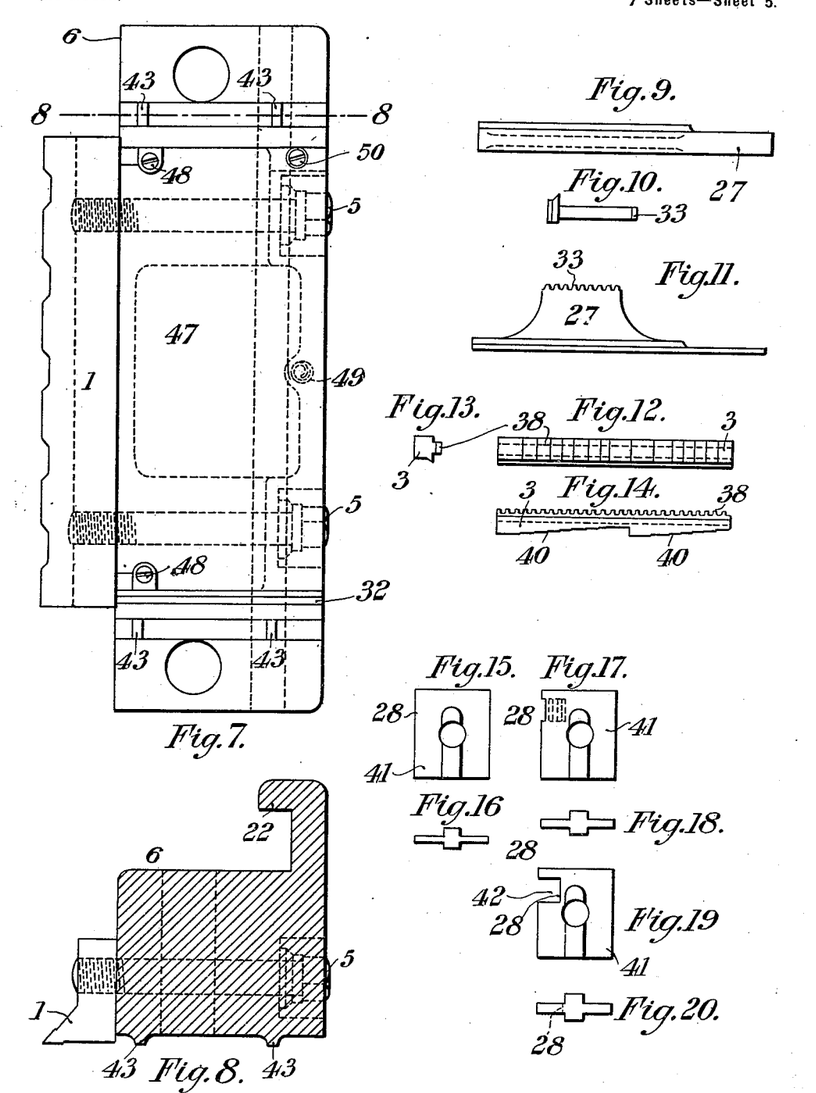
Fig. 7, an elevation, as seen from the left of the machine, of the movable knife and corresponding knife-block.
Fig. 8, a horizontal section on the line 8 8 of Fig. 7.
Figs. 9, 10, and 11, respectively, a side elevation, end elevation, and plan of the feeler of the arrangement shown in Figs. 1 to 6, inclusive.
Figs. 12, 13, and 14, respectively, a side elevation, end elevation, and plan of the gage of the same arrangement.
Figs. 15 and 16, respectively, a plan and edge view of one of the end liners of the mold-block arranged as in Figs. 1 to 6, inclusive, for the casting of linotypes of minimum thickness.
Figs. 17 and 18 and Figs. 19 and 20, views, corresponding, respectively, to Figs. 15 and 16, of alternative forms of end liners appropriate to the casting of thicker linotypes.

The present improvements for limiting the approximation of the separated knives to correspond with the width of the mold-slot are equally applicable to linotype-machines using the ordinary molds such as described in the before-mentioned specification of United States Letters Patent No. 436,532, and to those using adjustable molds such as described in the specification of United States Letters Patent No. 648,449, the foregoing devices being the same in both of these applications. In applying said improvements to an ordinary mold, as shown in Figs. 1, 2, 3, 4, 5, and 6, having the ends of its slot closed by liners between the cap and body portions, there is provided a feeler 27, which is automatically projected into the path of an abutment-surface 28 on the mold-wheel, being preferably the surface of one of the mold-liners. The said abutment-surface occupies a position more or less advanced on the mold-wheel, according to the particular font being cast. The feeler 27 is free to move in a direction fore and aft of the machine between undercut guides 29 29, secured to the right-hand side of the vise-frame P', and a stepped or tapered gage-bar 3, which directly limits the closing together of the knives and which is similarly free to move between the said feeler 27 and other undercut guides 30 30, also secured to the right-hand side of the vise-frame. The undercut guides 29 29 are each formed in part with a flat plate 31, which prevents cuttings and other particles detached from the linotypes from dropping onto the feeler 27, and a groove 32 is formed in the left-hand face of the movable knife-block 6 for receiving the said plates 31 31. The feeler 27, as shown in detail in Figs. 9, 10, and 11, is provided with a toothed rack 33, which engages with a spur-pinion 34, fixed on and near the lower end of a vertical spindle 35, turning in bearings 36 36, secured in a suitable recess 37 in the vise-frame P'.

To avoid unnecessary reiteration, the stepped or tapered gage-bar, which, as hereinafter particularly described, may be of either the stepped or tapered or both stepped and tapered construction, is hereinafter generally referred to as a "gage-bar" of the stepped construction.

The above-named gage-bar 3 is situated immediately below the feeler 27 and is parallel therewith, and there is a similar gage-bar 3 just above the trimming-knives 1 2, this bar being free to move backward and forward between undercut guides 30 30, secured by screws or otherwise to the vise-frame P'. Each of the two gage-bars 3 has integral therewith a toothed rack 38, which gears with a spur-wheel 39, fast on the vertical spindle 35 near, respectively, the lower and upper ends thereof, and the said bars are each provided with two sets of steps 40 40, as shown in Figs. 1, 2, 3, 4, 5, 6, 12, and 14. The depths of the risers of the steps when the gage-bars are of the stepped construction are respectively proportionate to the different thicknesses of linotype which the machine is capable of producing. The before-mentioned abutment-surface 28, as shown most clearly in Figs. 15, 16, 17, 18, 19, and 20, may most conveniently be formed on one of the two aliners 41 41$^a$ of the mold-block $o$, this being the right-hand end liner or distance-piece 41 between the cap-plate $o^{17}$ and bottom plate $o^{18}$ of the mold-block. For linotypes of the minimum thickness the abutment-surface 28 would be in advance of those appropriate to linotypes of greater thickness and would for the desired length of feeler 27 preferably be flush with the front face of the mold-block $o$. Therefore the end liner 41 for such a mold would be of substantially the form represented in Figs. 15 and 16. When linotypes of greater thickness are being produced and a feeler 27 of the same length as above is employed, the abutment-surface 28 occupies a position behind the plane of the front face of the mold-block $o$, and for linotypes of maximum thickness the end liner 41 of the mold-block $o$ would be of substantially the form represented in Figs. 19 and 20, from which it will be seen that the abutment-surface 28 constitutes the bottom of a somewhat deep recess 42. For linotypes of any thickness intermediate of the minimum and the maximum above mentioned the depth of the recess 42 in the end liner 41, and correspondingly the position of the abutment-surface 28, would vary in accordance therewith, as indicated in full lines in Fig. 17 (which lines represent the shallowest recess) and by the several dotted lines, which represent deeper recesses for the thicker linotypes. The stepped or inclined surfaces 40 40 of the gage-bars 3 3 are arranged to move backward and forward in and transversely to the paths followed by projections or bearing-pieces 43 43 on the left-hand face of the movable knife-block 6, these projections during the leftward travel of the knife-block coming to bear upon the particular steps 40 40 or portions of the inclined surfaces which are then standing in their path, the movable knife 1 being thereby arrested in a position more or less removed from the fixed knife 2, according, primarily, to the position of the abutment-surface 28 relatively to the front face of the mold-block $o$ and to the extent to which the gage-bars 3 3 are moved forward by such abutment-surfaces.

Each of the gage-bars 3 3 is provided with two sets of steps 40 40 or two inclined surfaces, and the movable knife-block 6 is provided with two pairs of projections or bearing-pieces 43 43 to coöperate therewith, one projection 43 for each set of steps or for each incline 40, these sets of steps or the inclines 40 40 and the respective projections 43 43 being spaced sufficiently apart from each other to provide a substantially extensive bearing-surface, which will insure that the movable knife 1 shall always be in the necessary position in relation to the fixed knife 2 during the passage of the linotypes between them.

To the front end of the gage-bar 3 is secured a bracket-arm 44, to which is connected the front end of a spring 45, whose rear end is attached to a pin 46, secured in the vise-frame P'. The two gage-bars 3 3 and the feeler 27 being all positively geared with the spindle 35, it follows that any forward or backward motion given to either of these three devices will be shared by the others. Thus it is that the spring 45 has a constant tendency to move all of these said devices rearward. As the longitudinal motion of the feeler 27 would usually be less than is necessary for moving the stepped gage-bars 3 3 into different positions sufficiently removed from each other for the projections 43 43 to contact with the desired steps exactly and without confusion, the linear motion of the said stepped bars is increased as compared with that imparted to the feeler 27, this result being obtained by the spur-wheels 39 39 being of larger diameter than the feeler-pinion 34. 47 is the usual check-plate, pivoted by the hinge-pins 48 48 at its rear edge to the movable knife-block 6 and acted on by a spring 49 for applying the necessary yielding resistance to the passage of the finished linotypes between the said knife-block and the vise-frame P', and 50 is a screw traversing the check-plate 47 and fixed in the movable knife-block 6 for limiting the movement of the check-plate 47 when it and the knife-block are moved away from the vise-frame P'.

Figure 1:
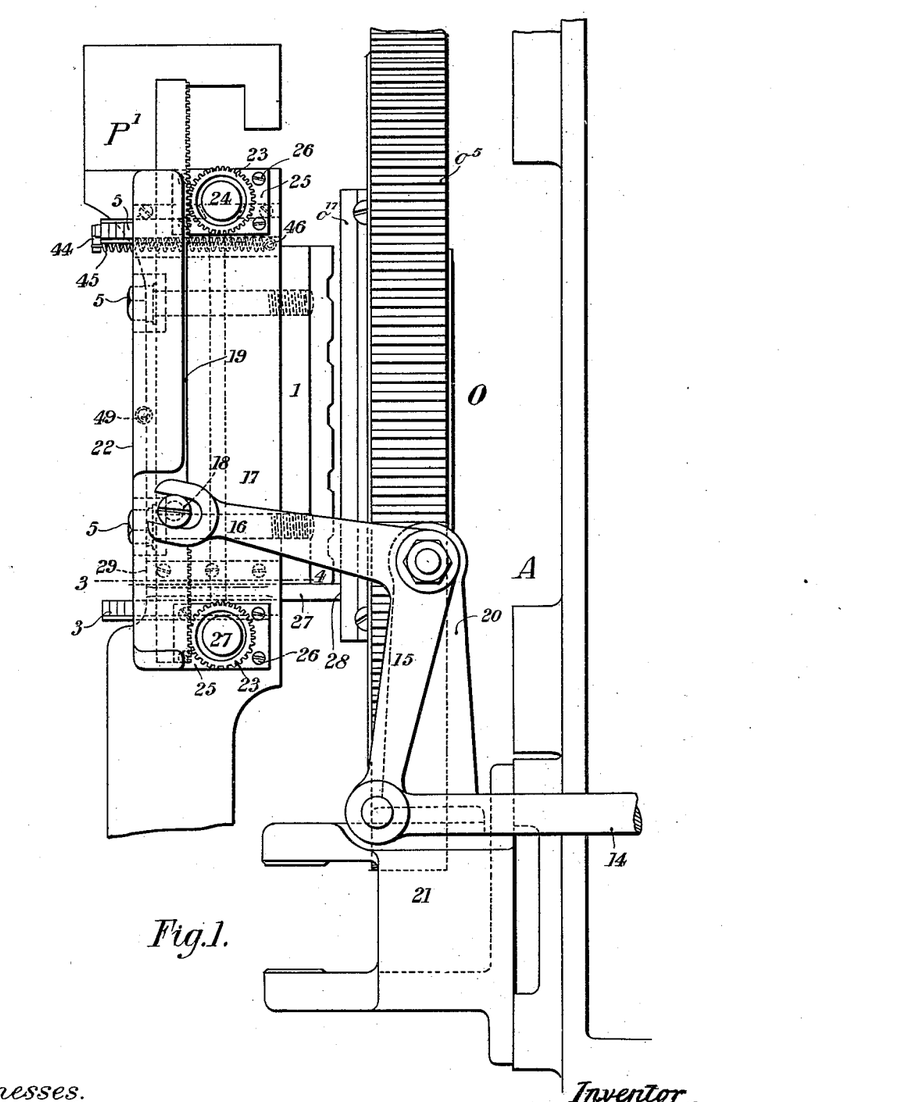
Figure 1 is a right-hand elevation showing the present improvements applied to a linotype-machine fitted with an ordinary mold-block, only those portions of the machine being represented which are considered necessary to illustrate the invention.
Figure 2:
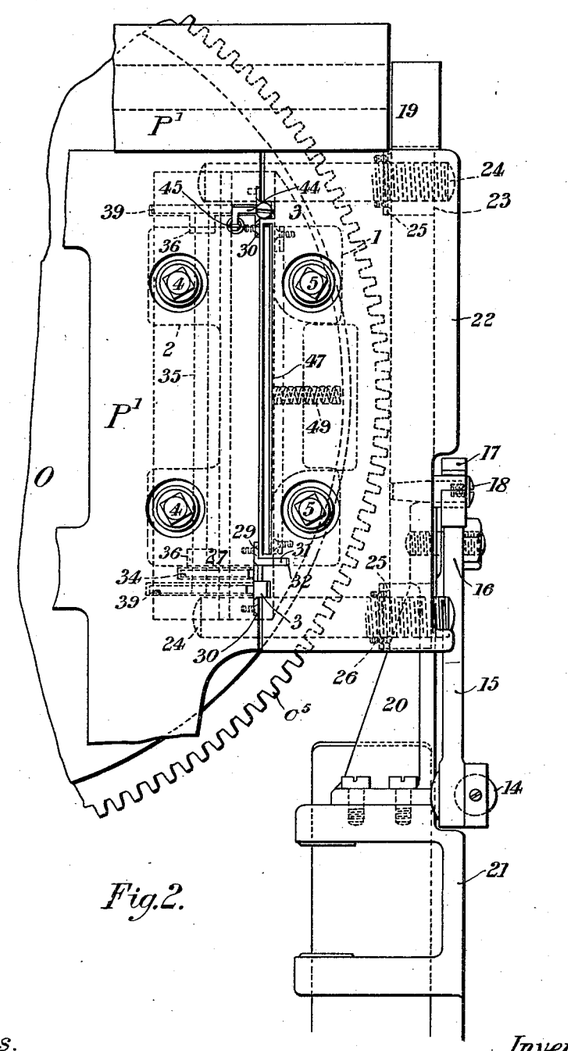
Fig. 2, a front view of Fig. 1.
Figure 3:
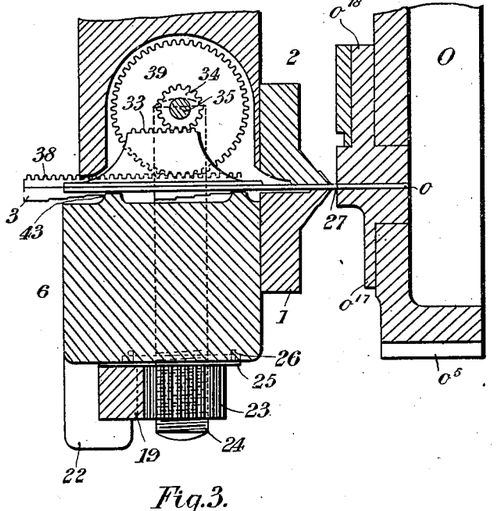
Figs. 3 and 4, horizontal sections, both on the lines 3 4 of Fig. 1, showing the apparatus in two different positions.
Figure 4:
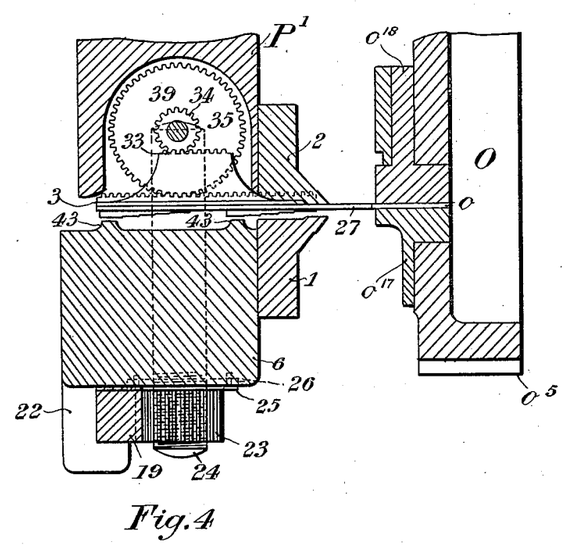
Figure 5:
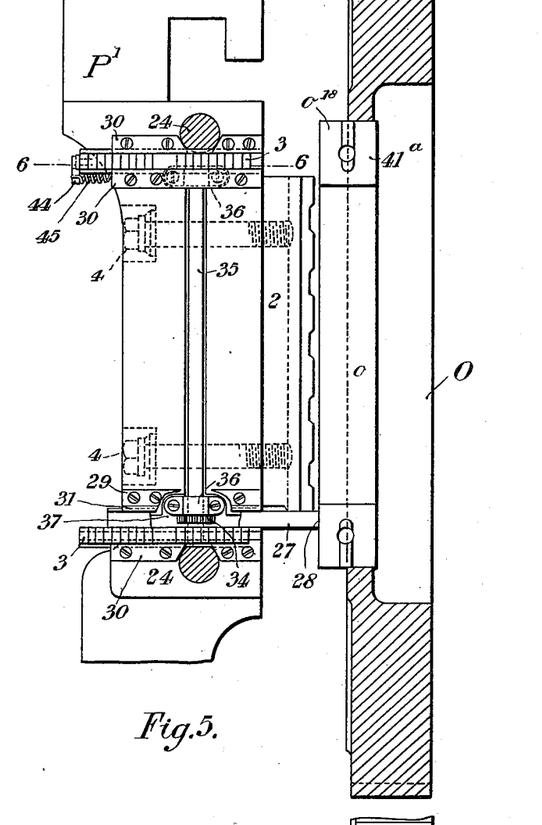
Fig. 5, a sectional view seen from the right of the machine, showing in elevation the fixed knife and corresponding knife-block.
Figure 6:
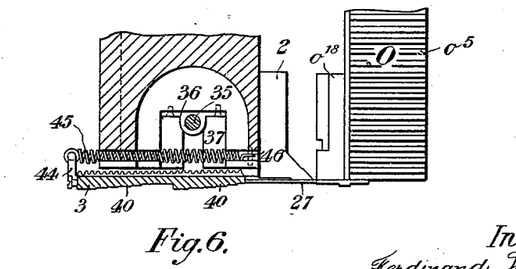
Fig. 6, a horizontal section on line 6 6 of Fig. 5.

As a convenient juncture in the cycle of the machine from which to describe the working of the before-described apparatus it is to be assumed that the various parts are in the respective positions in which they are represented in Fig. 4—that is to say, the mold-wheel O, with the mold-slot o in the vertical position, is just about to advance toward the knives 1 2, situated immediately in front of the mold-slot o, for the linotype to be ejected from the latter. Immediately this advance commences the cam 7 moves the rod 9 forward, and this through the lever 11, link 14, bell-crank lever 15 16, and rack 19 effects the rotation of the threaded pinions 23 23 in such direction as to cause the movable knife-block 6 to move rightward away from the vise-frame P' along the two studs 24 24, which serve to guide it into a position such as represented in Fig. 4. When the movable-knife block 6 is thus moved sidewise, and the restriction presented by the engagement of the projections 43 43 with the gage-bars 3 is thereby removed, the feeler 27 and the two gage-bars 3 3 are moved by the spring 45 into their rearmost position, all as shown in Fig. 4. As the mold-wheel O advances the end liner 41 thereon engages with the end of the feeler 27 and pushes it forward to a position appropriate, as aforesaid, to the thickness of the linotype then in the mold-slot o. The machine is shown in the drawings as adjusted for producing the thinnest linotypes. This forward motion of the feeler 27 through the rack 33 and pinion 34 effects the rotation of the spindle 35, and this through the pinions 39 39 and racks 38 effects the forward motion of the gage-bars 3 to the position in which the particular steps or portions of the inclines 40 40 thereof are in the path subsequently followed by the projections 43 43. Simultaneously, or thereabout, with the completion of the forward movement of the mold-wheel O the cam 7 becomes disengaged from the rod 9, whereupon the spring 10 causes the rack 19 to ascend and the threaded pinions 23 23 to rotate in such direction as to move the adjustable knife-block 6 toward the vise-frame P', this movement being terminated by the abutment of the projections 43 43 upon the particular steps or portions of the inclines 40 40 then in their respective paths, at which juncture the movable knife 1 is at a distance from the fixed knife 2 corresponding precisely to the thickness of the finished linotype, as shown in Fig. 3. The linotype is then ejected from the mold-slot o and trimmed by the knives 1 2 in the usual way and the machine brought to rest. The movable-knife block 6 remains in the last-named position until during the next cycle of the machine the cam 7 again actuates the rod 9. It will readily be seen that when the abutment-surface 28 is behind the plane of the mouth of the mold-slot o, as is the case with the wider mold-slots, the feeler 27 and gage-bars 3 3 will not be moved as far forward as they are when said abutment-surface is in the same plane therewith, and consequently more prominent steps or portions of the gage-bars 3 3 will be left standing in the paths of the projections 43 43, and the movable knife 1 in its leftward travel toward the fixed knife 2 will thereby be arrested when at a correspondingly-increased distance from the fixed knife.

From the foregoing it will be understood that the operation is briefly as follows: The cam 7 through the intermediate parts effects an extreme separation of the two knives. The mold advancing toward the knives causes the surface 28 to push back the feeler 27 a distance corresponding to the thickness of the mold-slot and linotype therein. The feelers through the intermediate parts move the gages or stops 3 to a position in which they will arrest the movable knife at exactly the required distance from its companion. The cam 7 releases the parts, and the spring 10 urges the movable-knife block and knife inward until they are arrested by the stops 3. In this way the knives are set at exactly the proper distance apart to properly trim the slug or linotype as it is driven between them from the mold.

In applying the before-described improvements to a linotype-machine having an adjustable mold-block, such as that described in the before-mentioned United States Letters Patent No. 648,449, the variation in the width of the mold-slot o is utilized for automatically effecting a corresponding variation in the distance between the two trimming-knives 1 2. In this arrangement the said mold-block has no end liners, and when in its vertical position it is moved forward toward the trimming-knives 1 2 it presents vacant slots 51 51 above and below the said knives, these slots forming virtual extensions of the mold-slot o. As the width of the vacant slots 51 51 varies with the width of the mold-slot o, these slots without necessitating any structural alterations may be used for determining the distance between the two trimming-knives 1 2. For this purpose each of the gage-bars 3 3 has formed on its rear end a feeler 27$^a$, of either a stepped form, such as shown in Figs. 21, 22, 23, 25, 26, and 28, or a tapered form, such as shown in Figs. 24, 27, 29, and 30, and each such bar 3 3 (as distinguished from those in the before-described arrangement) is individually moved forward by the direct action thereon of the respective feeler 27$^a$. To the front end of each combined gage-bar 3 and feeler 27$^a$ is connected one end of a spring 45, whose opposite end is attached to a pin 46, fast in the vise-frame P', the said springs having a constant tendency to move the gage-bars and feelers rearward.

The operation of the last-described arrangement is as follows, it being for convenience assumed that at the commencement of such operation the machine is at that stage of its cycle in which the mold-slot o is vertical, with the linotype within it in line with the space between the trimming-knives 1 2 and with the ejector. Immediately the mold-wheel O commences to advance the cam 7, as previously described, effects the sidewise movement of the movable knife-block 6 and knife 1 away from the vise-frame P' and fixed knife 2, whereupon the springs 45 45 project the gage-bars 3 3 and feelers 27$^a$ 27$^a$ into their rearmost positions, as indicated in full lines in Figs. 21, 22, and 31. As the mold-wheel O advances the feelers 27$^a$ 27$^a$ are received in the vacant slots 51 51 and penetrate thereinto until stopped by the sides of such slots engaging the sides or steps of the feelers 27$^a$ 27$^a$, after which the mold-wheel O and feelers 27$^a$ 27$^a$ move forward as if in one piece with each other. Simultaneously, or thereabout, with the completion of the forward motion of the mold-wheel O the cam 7 becomes disengaged from the rod 9, and the spring 10 causes the movable knife-block 6 to approach the vise-frame P', this movement terminating when the projections 43 43 reach the particular steps or portions of the inclines 40 40 then in their respective paths, at which time the movable knife 1 is at a distance from the fixed knife 2 corresponding to the thickness of the finished linotype, and it is retained in such position by the spring 10 until the cam 7 next moves it therefrom. The linotype is then ejected from the mold-slot o and trimmed by the knives in the usual way and the machine brought to rest.

The gage-bars 3 3 for use in conjunction with the adjustable mold may be of either of the several forms shown in Figs. 23 to 30, inclusive, in each of which the right-hand stepped or tapered end is that which constitutes the feeler 27$^a$ and penetrates to a varying extent into the above-mentioned vacant slot 51. The two other stepped or tapered surfaces 40 40 are those with which the projections or bearing-pieces 43 43 engage to stop the movable knife 1 in its approach to the fixed knife 2.

The gage-bars 3 3 used in conjunction with the ordinary mold-block (represented in Figs. 1, 2, 3, 4, 5, and 6) instead of being stepped, as hereinbefore generally described, may be of tapered form. If tapered gage-bars 3 3 are employed, the engaging faces of the projections or bearing-pieces 43 43 may, if desired, be inclined to correspond therewith.

It will be perceived that the main difference between the second embodiment of my invention and the first lies in the fact that in the second arrangement the stops or gages 3 receive motion directly from the feelers 27 instead of receiving motion through intermediate devices.

I believe myself to be the first to combine with the trimming-knives of a linotype-machine automatic mechanism whereby the knives are automatically adjusted as to the distance between them to correspond with the thickness of the variable mold-slot.

I claim—

1. In a linotype-machine, the combination of a linotype-mold, knives for trimming the linotype, and automatic devices for adjusting the distance between the knives to correspond with the thickness of the mold-slot and the linotype produced therein.

2. In a linotype-machine, the combination of a mold, knives for trimming the linotype formed in the mold, automatic devices for effecting a separation and approximation of the knives, and means actuated by the mold for limiting the approximation of the knives substantially as described, whereby the distance between the knives is automatically regulated to correspond with the thickness of the mold-slot and the linotype produced therein.

3. In a linotype-machine the combination with the trimming-knives one stationary and the other movable, of a block carrying the movable knife, threaded pinions swiveled to the block, screwed studs fixed relatively to the stationary knife and serving to guide the block, the said pinions being screwed on the studs, a rack engaging the pinions, and operative devices for the rack, serving to reciprocate it longitudinally, substantially as set forth.

4. In a linotype-machine the combination with the trimming-knives one stationary and the other movable and means for moving the movable knife away from and toward the fixed one, of an adjustable gage-bar of varying thickness and means for adjusting the position of the said gage-bar to arrest the movable knife at a predetermined position according to the thickness desired for the finished linotype, substantially as set forth.

5. In a linotype-machine the combination with the trimming-knives and the movable mold-carrier, of an adjustable gage-bar of varying thickness, a spring for projecting said gage-bar rearward toward the mold-carrier, and a feeler pushed forward by the mold-carrier, and in operative connection with the adjustable gage-bar so that the said bar will move rearward and forward therewith, substantially as set forth.

6. In a linotype-machine the combination with the trimming-knives and means for automatically moving one of them away from the other, and with the movable mold-carrier, of a spring-controlled feeler moved in one direction by the mold-carrier and two movable gage-bars of varying thickness and differential gear connecting the said bars with the feeler, substantially as set forth.

7. In a linotype-machine the combination with the linotype-body mold, of means controlled by the mold for automatically and correspondingly varying the distance between the trimming-knives substantially as set forth.

8. In a linotype-machine the combination with the trimming-knives and the movable mold-carrier and means for automatically moving the knives relatively away from and toward each other at each cycle of the machine, of a feeler adapted to engage an abutment-surface moving with, and occupying a variable position on, the mold-carrier for determining the relative movement of the knives toward each other, substantially as set forth.

9. In a linotype-machine the combination with the trimming-knives and the movable mold-block and means for automatically moving the knives relatively away from and toward each other at each cycle of the machine, of a stepped or tapered feeler adapted to enter the mold-block to an extent varying with the width of the mold-slot therein for correspondingly varying the extent of the relative movement of the knives toward each other, substantially as set forth.

In testimony whereof I hereto affix my signature in the presence of two witnesses.

FERDINAND JOHN WICH.

Witnesses:
  W. CHADWICK,
  G. L. HOYT.